United States Patent

Hase et al.

Patent Number: 5,910,383
Date of Patent: Jun. 8, 1999

[54] PRODUCTION PROCESS OF CARBONACEOUS MATERIAL AND BATTERY

[75] Inventors: Yoshihiko Hase; Hidetoshi Morotomi; Hiromi Okamoto; Syoji Komura; Yasuyuki Takigawa; Shigeyuki Hirano; Tetsuo Shiode, all of Tokyo, Japan

[73] Assignee: Adchemco Corporation, Tokyo, Japan

[21] Appl. No.: 08/928,262

[22] Filed: Sep. 12, 1997

[30] Foreign Application Priority Data

Sep. 13, 1996 [JP] Japan .................................. 8-263746

[51] Int. Cl.$^6$ ............................. H01M 4/58; H01M 4/60
[52] U.S. Cl. ........................................ 429/231.4; 423/447.4
[58] Field of Search ........................ 429/218; 423/447.4, 423/447.2; 208/22, 39

[56] References Cited

U.S. PATENT DOCUMENTS

| | | |
|---|---|---|
| 5,153,082 | 10/1992 | Ogino et al. . |
| 5,306,582 | 4/1994 | Tanaka . |
| 5,312,611 | 5/1994 | Takami et al. . |
| 5,344,724 | 9/1994 | Ozaki et al. . |
| 5,527,643 | 6/1996 | Sonobe et al. . |
| 5,543,021 | 8/1996 | Yazami et al. . |
| 5,556,723 | 9/1996 | Ohsaki et al. . |
| 5,612,155 | 3/1997 | Takami et al. . |
| 5,614,164 | 3/1997 | Sumner et al. ................. 423/447.4 |
| 5,622,793 | 4/1997 | Iijima et al. ..................... 429/218 |

*Primary Examiner*—Maria Nuzzolillo
*Assistant Examiner*—Carol Chaney
*Attorney, Agent, or Firm*—Oblon, Spivak, McClelland, Maier & Neustadt, P.C.

[57] ABSTRACT

A process is provided for the production of a carbonaceous material. The process comprises the following steps: subjecting a vacuum distillation residual pitch to heat treatment until the content of quinoline-insoluble components thereof becomes 50 to 85 wt. %, whereby the pitch is converted into a mesophase pitch; grinding the thus-obtained mesophase pitch into fine particles having an aspect ratio not greater than 2; subjecting the thus-ground product to oxidation treatment; and subjecting the thus-oxidized product to carbonization or graphitization treatment. A lithium ion secondary battery comprises a negative pole made of the carbonaceous material.

9 Claims, 1 Drawing Sheet

PRODUCTION PROCESS OF CARBONACEOUS MATERIAL AND BATTERY

BACKGROUND OF THE INVENTION a) Field of the Invention

This invention relates to a production process of a carbonaceous material, and more specifically has as an object thereof the economical provision of a carbonaceous material assuring high performance, for example, as a negative pole material for lithium ion secondary batteries.

b) Description of the Related Art

In recent years, lightweight and compact designs have been rapidly adopted for electronic equipments and communication equipments. Keeping in step with this, a strong demand has also arisen for the size and weight reduction of secondary batteries which are used as their driving power supplies. Lithium ion secondary batteries having high energy density and high voltage have been proposed.

A lithium ion secondary battery uses, for example, lithium cobalite for a positive pole and a carbonaceous material such as graphite for a negative pole, so that lithium ions are occluded in the carbonaceous material during charging and these lithium ions are released from the negative pole upon discharging.

Lithium cobalite is used most widely as a positive pole material these days although a variety of materials have been proposed. As a negative pole material, on the other hand, carbon is used primarily. Examples of this carbon can be divided principally into graphitic crystalline materials and carbonaceous amorphous materials.

As one example of the graphitic crystalline materials, spheroidal fine particles of mesophase pitch are used as a negative pole material. These spheroidal fine particles of mesophase pitch are fine particles, which deposit in a spheroidal form in various pitches when the pitches are heated to temperatures of from 350° C. to 500° C. They have a graphite-like structure. If the above-described heat treatment of each pitch is continued as is, the whole pitch is eventually converted into coke. To obtain the above-described fine particles of mesophase pitch, it is therefore necessary to add a solvent to the heat-treated pitch in the course of the formation of spheroidal fine particles of mesophase pitch and then to separate the fine particles alone by centrifugation or a like method [see, for example, Japanese Patent Application Laid-Open (Kokai) No. HEI 4-115458].

The separation of the spheroidal fine particles of mesophase pitch is conducted from the high-viscosity molten pitch containing the solvent added therein, so that the separation requires cumbersome procedures and moreover, the amount of the spheroidal fine particles available per 100 parts by weight of the pitch used is as low as about 10 to 30 parts by weight or so, that is, the yield is very low. In addition, there is a problem of recovery of the solvent employed. Accordingly, for not only the cumbersome procedures but also the low yield, the resulting spheroidal fine particles of mesophase pitch is accompanied by the problem that they are extremely costly despite the use of the inexpensive raw material. This has become one of causes for the high cost of lithium ion secondary batteries as final products.

As a measure for overcoming the above-described problems, a process has been proposed for the provision of a carbonaceous material. According to this process, coal tar pitch is treated with quinoline to collect quinoline-soluble components. Further, toluene-insoluble components are removed from the quinoline-soluble components, whereby a so-called "β-resin" is prepared. The "β-resin" is hydrogenated and is then converted into a heavier resin, i.e., a mesophase pitch. Using this mesophase pitch as a raw material, the carbonaceous material is provided [Japanese Patent Publication (Kokoku) No. SHO 64-33186 and Japanese Patent Application Laid-Open (Kokai) No. HEI 7-223808].

The above-described process is however accompanied by the problem that quinoline and toluene, which have high boiling points and high toxicity, are used in large amounts, although good spheroidal carbon powder can be obtained. Many unsolved problems therefore still remain, including handling and recovery problems of these solvents. As a consequence, there is the problem that the resulting spheroidal carbon material becomes considerably costly.

SUMMARY OF THE INVENTION

An object of the present invention is therefore to economically provide a carbonaceous material assuring high performance, for example, as a negative pole material for lithium ion secondary batteries without using any solvent the handling of which is cumbersome, such as quinoline.

To achieve the above-described object, the present invention provides a process for the production of a carbonaceous material comprising the following steps: subjecting a vacuum distillation residual pitch to heat treatment until the content of quinoline-insoluble components thereof becomes 50 to 85 wt. %, whereby the pitch is converted into a mesophase pitch; grinding the thus-obtained mesophase pitch into fine particles having an aspect ratio not greater than 2; subjecting the thus-ground product to oxidation treatment; and subjecting the thus-oxidized product to carbonization or graphitization treatment; and also a lithium ion secondary battery comprising a negative pole made of the above carbonaceous material.

According to the present invention, a vacuum distillation residual pitch is subjected to heat treatment until the content of its quinoline-insoluble components becomes 50 to 85 wt. %, whereby a pitch is converted into a mesophase pitch. The mesophase pitch is ground into fine particles, which are then subjected to oxidation treatment so that the ground particles change into a form resembling a spheroidal form. By subjecting the thus-oxidized particles to carbonization or graphitization in this form, fine carbonaceous particles are obtained with $Li^+$-occluding capacity comparable or greater than that of conventional spheroidal fine particles of mesophase pitch separated from a heat-treated pitch.

According to the present invention, a carbonaceous material assuring high performance, for example, as a negative pole material for lithium ion secondary batteries can therefore be economically provided at a high yield by simple procedures without using any solvent such as quinoline or toluene.

DETAILED DESCRIPTION OF THE INVENTION AND PREFERRED EMBODIMENTS

Figure 1:
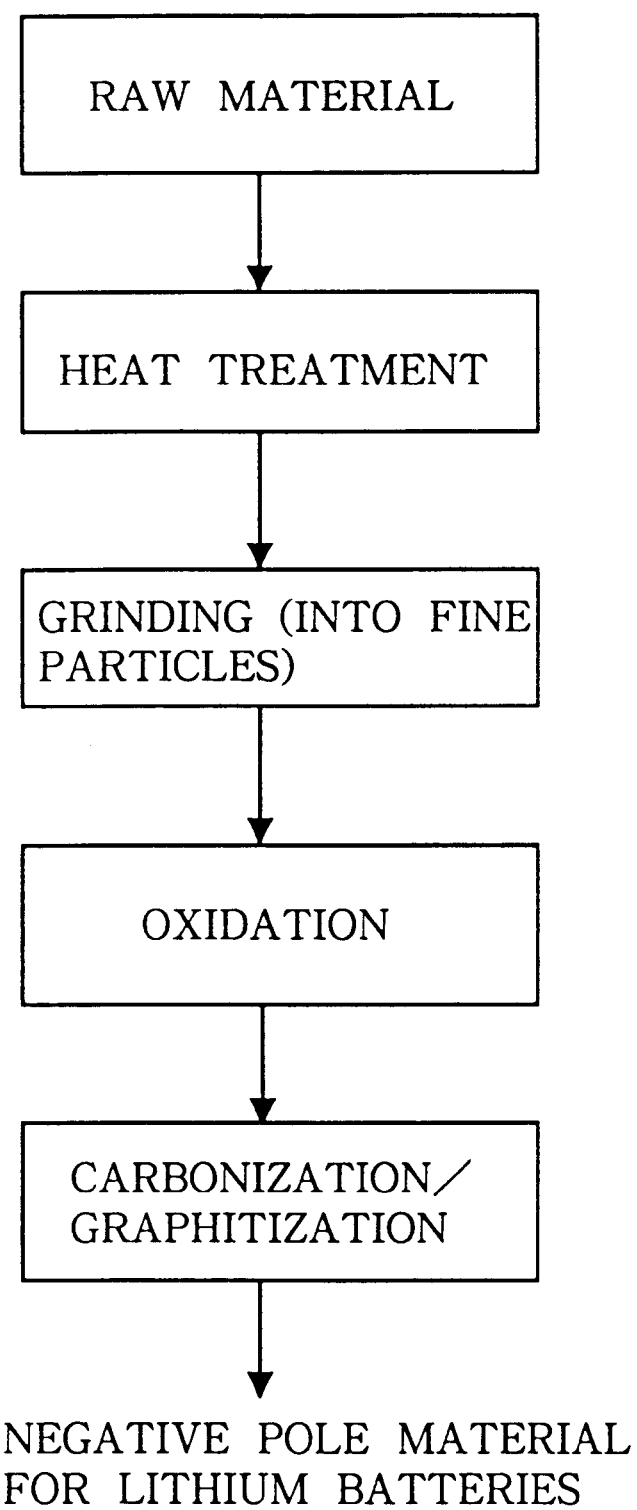
FIG. 1 is a flow sheet of a production process according to the present invention.

Based on preferred embodiments, the present invention will next be described in detail.

The production process of the present invention is characterized in that, as is illustrated in the production flow sheet of FIG. 1, it comprises the following steps: subjecting a vacuum distillation residual pitch to heat treatment until the content of quinoline-insoluble components thereof becomes 50 to 85 wt. %, whereby said pitch is converted into a mesophase pitch; grinding the thus-obtained mesophase pitch into fine particles having an aspect ratio not greater than 2; subjecting the thus-ground product to oxidation treatment; and subjecting the thus-oxidized product to carbonization or graphitization treatment.

The vacuum distillation residual pitch useful as a raw material in the present invention is a residual fraction of further vacuum distillation of coal tar from which light components have been removed by atmospheric distillation. Preferably, coal tar is processed in an centrifugator to remove solid impurities. The thus-processed coal tar is then subjected to steam distillation in an atmospheric distillation tower so that light components are removed from the coal tar to obtain a fraction having a boiling point of 280° C. or higher. This fraction can be obtained generally by conducting atmospheric distillation under such conditions that the charged coal tar is reduced preferably to 75 parts by weight or less, more preferably to 70 parts by weight or less per 100 parts, although the end point of the atmospheric distillation varies depending on the kind of the used coal tar and cannot be specified in a wholesale manner.

The vacuum distillation is conducted to subject the atmospheric distillate to further distillation under reduced pressure so that light components still remaining in the atmospheric distillate are removed. Heating of this atmospheric distillate is conducted in a hot kiln in such a way that vacuum distillation is performed for a short time at a heating temperature of 360° C. or lower, preferably at a temperature of from 300 to 360° C. under a reduced pressure of 50 Torr or lower, preferably 30 Torr or lower. Light components are substantially removed by the vacuum distillation. Although pitches having varied softening points are obtained depending on conditions for the vacuum distillation, the vacuum distillation in the present invention is conducted by setting conditions such as heating temperature, heating time and vacuum level so that the softening point of the resulting vacuum distillation residual pitch falls within a range of from 100° C. to 120° C., preferably of from 105° C. to 115° C. Under such vacuum distillation conditions as resulting in a softening point higher than the above range, there is the potential problem that during vacuum distillation, coking may take place inside a tube of the hot kiln and stable operation of the vacuum distillation may be hampered accordingly. A vacuum distillation residual pitch available in the above-described manner is narrow and constant in the molecular weight distribution of components contained therein, contains toluene-insoluble components in a total amount not exceeding 25 wt. % and quinoline-insoluble components in a total amount not surpassing 4 wt. %, and is stable in quality.

Incidentally, omission of the vacuum distillation in the process of the present invention leads to inconveniences such as those to be described hereinafter. A pitch the softening point of which is from 100 to 120° C. is also obtained by subjecting to heat treatment a pitch which has been obtained by atmospheric distillation. The resulting, heat-treated pitch is however accompanied by inconveniences such that it has a broad molecular weight distribution, fused polycyclic aromatic compounds contained in the mesophase of the mesophase pitch have an uneven molecular weight distribution, and the occluded quantity of lithium ions is small when the carbonaceous material obtained by the subsequent carbonization or graphitization is used as a negative pole material for lithium batteries.

In the present invention, the vacuum distillation residual pitch prepared as descried above is subjected to heat treatment. This heat treatment is conducted at 420° C. or lower, preferably at 395 to 400° C. while introducing a non-oxidizing gas such as nitrogen gas. The the introduction of this gas makes it possible to keep uniform the temperature of the molten pitch, to prevent localization of pitch components, and further to forcedly remove low-boiling substances still remaining in the pitch. When the non-oxidizing gas is controlled at a flow rate of 0.05 $Nm^3$/pitch-kg.hr or higher, preferably of 0.15 to 0.20 $Nm^3$/pitch-kg.hr, the time of the above-described heat treatment may be generally from about 3 to 7 hours, preferably from about 4 to 6 hours.

Further, to permit continuous elimination of light components which are to be formed during the heat treatment, a reactor is provided with an outlet tube and is also provided with a pressure regulating valve to maintain the internal pressure of the reactor at 9 $kg/cm^2$.G or lower, preferably 5 $kg/cm^2$.G or lower. The above heat treatment is conducted until the content of quinoline-insoluble components in the heat-treated pitch becomes 50 to 85 wt. %, preferably until the content of quinoline-insoluble components becomes 50 to 85 wt. % and the content of toluene-insoluble components become 70 to 95 wt. %, more preferably until a mesophase pitch in which the content of quinoline-insoluble components is from 55 to 80 wt. % and the content of toluene-insoluble components is from 70 to 90 wt. % is obtained.

A content of quinoline-insoluble components lower than 50 wt. % involves problems such that fine particles of mesophase pitch may be fused together upon oxidation treatment and the fine particles may be converted into a hardly graphitizable structure when oxidized. A content of quinoline-insoluble components higher than 85 wt. % is accompanied by problems such that coking of the vacuum distillation residual pitch proceeds to lose thermal fusibility and upon grinding the mesophase pitch, the resulting particles are not rounded and hence have a greater aspect ratio. Concerning toluene-insoluble components, a content outside the above-described range leads to occurrence of similar problems and is hence not preferred.

It is preferred to conduct the above heat treatment by setting conditions such as heating temperature, heating time and pressure so that the softening point falls within a range of 280° C. and higher, preferably of from 320 to 370° C., more preferably of from 330 to 365° C. If the softening point of the heat-treated pitch is lower than 280° C., fine particles of mesophase pitch have not been formed in a sufficient amount. If the softening point of the heat-treated pitch is higher than 370° C., the pitch loses fluidity so that its handling become difficult. Softening points outside the above range are therefore not preferred.

During the above-described heat treatment, spheroidal fine particles of mesophase pitch are formed and allowed to grow continuously in the pitch, so that the ratio of optically isotropic components to an optically anisotropic component (spheroidal fine particles of mesophase pitch) in the pitch varies. It is therefore preferred to confirm their ratio by sampling in the course of the heat treatment so that the above-described heat treatment conditions can be set to make the optically anisotropic component amount to 50 vol. % or higher of the whole pitch, preferably to make it fall within a range of from about 60 to 95 vol. % of the whole pitch while causing the optically isotropic components to be evenly dispersed in the optically anisotropic component.

If the content of the optically anisotropic component in the heat-treated pitch is lower than 50 vol. %, problems arise in that longer infusibilization time is required for the oxidation of the pitch to a predetermined oxygen concentration and crystalline properties are deteriorated when the pitch is carbonized or graphitized subsequently. If the content of the optically anisotropic component in the heat-treated pitch is higher than about 95 vol. %, on the other hand, other problems arise in that particles available by grinding the heat-treated pitch have a greater aspect ratio and do not change into a form resembling a spheroidal form upon oxidation treatment.

The above-described pitch of the high melting point is next cooled, and is then ground to have particle sizes under 200 mesh. In terms of average particles size, the pitch is ground to 50 $\mu$m or smaller, preferably to a range of from 5 to 30 $\mu$m. No particular limitation is imposed on a grinding apparatus. For example, a grinding apparatus such as a ball mill, mixing mill or jet grinder is usable.

The thus-ground product is then subjected to oxidation treatment. This oxidation treatment is conducted preferably at an oxygen concentration of from 16 to 18 wt. % or so while feeding nitrogen gas into an oxidizing kiln, although it may be conducted at a temperature of from 140 to 300° C. in air. Further, to avoid sintering of ground particles into fused aggregates during oxidation, it is preferred to divide the oxidizing kiln into a multiplicity of sections so that the oxidizing kiln can be precisely temperature-controlled. For the prevention of the ground product from contacting a heat source, it is also preferred to conduct the oxidation treatment of the ground product in the form of a fluidized bed or to cause the ground product to pass as a thin layer through the oxidizing kiln.

Concerning the extent of oxidation in the above oxidation treatment, it is desired to set oxidizing conditions so that the oxidized product is brought into such a state as containing about 2 to 10 wt. % of oxygen. If the content of oxygen is lower than the above range, in other words, if the oxidation is insufficient, problems arise in that the oxidized product are fused together again in the carbonization or graphitization step and the optical structure (mesophase) inside the particles cannot be retained in the carbonaceous material of the present invention obtained as the final product. If the oxidation is excessive, on the other hand, the oxidized product has higher amorphousness so that its crystalline properties are deteriorated and/or its specific surface area is increased. Oxygen contents outside the above range are therefore not preferred.

The particles, which have been subjected to the above-described grinding and oxidation treatment, are somewhat round particles because of elimination of sharp corners from the particles by frictional energy exerted upon grinding and thermal energy produced during the oxidation reaction. Their aspect ratio therefore falls within a range of from 1 to 2.

Finally, the carbonization or graphitization of the above-described oxidized product is conducted in a manner known per se in the art. The carbonization treatment is conducted at a temperature of from 700° C. to 1,200° C., while the graphitization treatment is carried out at a temperature of from 2,500 to 3,000° C. The times of the respective treatments vary depending on an apparatus to be employed, so that it is only necessary to choose optimal times in accordance with the apparatus employed. The carbonization or graphitization treatment can also be conducted in a continuous manner. The carbonization or graphitization can be effected by using various conditions and an apparatus, which are known to date, without modifications. In this carbonization or graphitization treatment, the oxygen contained before the treatment is substantially released although no significant change takes place in the shape of the particles.

The above-described carbonaceous material of the present invention is useful for various applications. A description will now be made about a lithium ion secondary battery as one of such applications. The lithium ion secondary battery uses as positive and negative electrode plates those carrying layers of positive and negative active materials on current collectors made of metal foils, respectively, and employs a non-aqueous organic solvent as an electrolyte. It can perform charging and discharging by exchanges of electrons upon movements of lithium ions between the electrodes as positive and negative poles.

The layers of the active materials, which form the electrode plates, are each formed from an electrode coating formulation composed of at least the active material and a binder. A lithium ion secondary battery having a discharge voltage as high as about 4 volts or so is obtained by using the above-described carbonaceous material of this invention as a negative pole active material and employing, for example, lithium oxides such as $LiCoO_2$ and $LiMn_2O_4$ and chalcogen compounds such as $TiS_2$, $MnO_2$, $MoO_3$ and $V_2O_5$ either singly or in a combination as a positive pole active material. Preferably, these active materials should be evenly dispersed in the resulting coating layers. For this purpose, it is preferred to use each of the positive and negative active materials in the form of powder having particles sizes in a range of from 1 to 100 $\mu$m and an average particle size of 10 $\mu$m or so.

For use in the layers of the active materials, a binder can be chosen as desired, for example, from thermoplastic resins, namely, polyester resins, polyamide resins, polyacrylate ester resins, polycarbonate resins, polyurethane resins, cellulose resins, polyolefin resins, polyvinyl resins, fluorine-containing resins, polyimide resins and the like.

The layers of the active materials, which form the electrode plates, are each prepared by procedures to be described next. A binder, which has been chosen as desired from the above-described materials, and an active material in the form of fine powder are first kneaded, dispersed or dissolved by using a suitable dispersion medium, whereby an electrode coating formulation is prepared.

The thus-obtained coating formulation is next coated on a current collector. As a coating method, gravure coating, gravure reverse coating, die coating, slide coating or the like can be used. The thus-coated current collector is then processed through a drying step to dry up the coating formulation so coated, whereby a layer of the active material is formed to a desired thickness. Positive and negative electrodes plates are obtained in the above-described manner.

Preferred usable examples of the collectors used in the electrode plates include metal foils such as aluminum and copper foils. Concerning the thicknesses of the metal foils, those of 10 to 30 $\mu$m or so are used.

When a lithium ion secondary battery is produced by using as positive and negative poles the electrode plates prepared as described above, a non-aqueous electrolyte prepared by dissolving a lithium salt as a solute in an organic solvent is used as an electrolyte.

Usable examples of the organic solvent can include cyclic esters, linear esters, cyclic ethers and linear ethers, for example, propylene carbonate as a cyclic ester, dimethyl carbonate as a linear ester, tetrahydrofuran as a cyclic ether, and 1,2-dimethoxyethane as a linear ether.

Usable examples of the lithium salt, which is employed as the solute together with the above-described organic solvent to form the non-aqueous electrolyte, can include inorganic lithium salts such as $LiClO_4$, $LiBF_4$, $LiPF_6$, $LiAsF_6$, $LiCl$ and $LiBr$; and organic lithium salts such as $LiB(C_6H_5)_4$, $LiN(SO_2CF_3)_2$, $LiC(SO_2CF_3)_3$, $LiOSO_2CF_3$, $LiOSO_2C_2F_5$, $LiOSO_2C_3H_7$, $LiOSO_2C_4F_9$, $LiOSO_2C_5F_{11}$, $LiOSO_2C_6F_{13}$ and $LiOSO_2C_7F_{15}$.

Based on Examples and Comparative Examples, the present invention will next be described in further detail.

EXAMPLE 1

As a raw material, was employed a vacuum distillation residual pitch having a softening point of 115.0° C., containing 2.3 wt. % of quinoline-insoluble components and 19.1 wt. % of toluene-insoluble components, and having a number average molecular weight of 494 and a narrow molecular weight distribution.

The raw material was introduced into a reaction vessel which had been preheated at 270° C. The reaction vessel had a non-oxidizing gas inlet nozzle in a bottom part preheated at 270° C., and was also equipped with a mechanical stirrer. Its effective internal capacity was 1.2 m$^3$ (outer diameter: 1,200 mm, height: 2,700 mm). After the raw material was heated to 400° C. at a heating rate of 10° C./hour subsequent to its introduction, heat treatment was conducted for 6 hours with stirring at 120 rpm while introducing nitrogen gas at 0.17 Nm$^3$/pitch-kg.hour through the nozzle to maintain the internal pressure of the reaction vessel at 5 kg/cm$^2$.G. During the heat treatment, the melt inside the reaction vessel remained under fully-mixed conditions.

The yield of the pitch so heat-treated was 67.5 wt. %. Its softening point was 364° C., and the content of an optically anisotropic component as determined in terms of a visual count under a polarizing microscope was 74 vol. %. It was a mesophase pitch in which optically isotropic components were evenly dispersed in the optically anisotropic component. The content of quinoline-insoluble components in the pitch was 70 wt. %, while the content of toluene-insoluble components in the pitch was 83 wt. %.

The mesophase pitch was ground in a jet mill, thereby obtaining fine powder which had an aspect ratio not greater than 2, was free of particles of 48 μm or greater in particle size, contained fine particles of 2 μm and smaller in particle size in a proportion not greater than 3 wt. % and had an average particle size of 16 μm.

The fine powder was heated in an air stream at a heating rate of 4° C./min from 130° C. to 260° C., at which the fine powder was held for 20 minutes to conduct oxidization treatment. By the application of the oxidization treatment, was obtained fine powder of mesophase pitch more rounded in shape than the fine powder at the time of the grinding, containing an optical structure (mesophase) fixed therein and having an oxygen content of 5.4 wt. %.

In a nitrogen atmosphere the fine powder was then heated at a heating rate of 3° C./hour to 1,100° C., at which the fine powder was subjected to carbonization treatment for 2 hours. Further, the thus-carbonized fine powder was subjected to graphitization treatment at 3,000° C. for 2 hours. As a result, a graphitized product was obtained at a yield of 82 wt. %. The thus-obtained graphite particles had a crystal lattice constant $C_0$ of 6.73 Å, Lc (the size of each crystallite along the c-axis) of 710 Å, and a specific surface area of 0.85 m$^2$/g.

In this Example, the yield of the carbonaceous material of the present invention obtained as a final product was 55 wt. % based on the starting raw material. In contrast, the yield was as low as about 24 wt. % at most according to the conventional process, that is, the process in which spheroidal fine particles were separated from a heat-treated mesophase pitch.

EXAMPLE 2

A carbonaceous material according to the present invention was obtained in a similar manner as in Example 1 except that the heat treatment time of the vacuum distillation residual pitch was changed to 5 hours. The carbonaceous material was also evaluated as an electrode material. Incidentally, the content of quinoline-insoluble components in the heat-treated product was 65 wt. % while the content of toluene-insoluble components in the heat-treated product was 76 wt. %. Its softening point was 350° C., the content of the optically anisotropic component as determined in terms of a visual count under the polarizing microscope was 51 vol. %, and the oxygen content of the oxidized product was 5.7 wt. %.

COMPARATIVE EXAMPLE 1

Carbonization treatment was conducted in the same manner as in Example 1 except that the ground product of the mesophase pitch, in which the optically isotropic components were evenly dispersed in the optically anisotropic component, was not subjected to the oxidation treatment. Since the fine particles were fused together in the carbonization treatment, they were ground again. The resulting particles however had an aspect ratio of 3.2. The fine powder was subjected to graphitization treatment as in Example 1. A carbonaceous material was then obtained as a comparative example in a similar manner as in Example 1. The carbonaceous material was also evaluated as an electrode material.

COMPARATIVE EXAMPLE 2

A carbonaceous material was obtained as another comparative example in the same manner as in Example 1 except that in place of the vacuum distillation residual pitch, a pitch left after atmospheric distillation of coal tar was used as a raw material subsequent to its heat treatment (i.e., the pitch was subjected to heat treatment without vacuum distillation so that the softening point was adjusted to 112.0° C.). The carbonaceous material was also evaluated as an electrode material.

Evaluation of Electrode Materials

Concerning each of the above Examples and Comparative Examples, 95 parts by weight of the fine carbonaceous powder obtained in the Example or Comparative Example and 5 parts by weight of a binder (polytetra-fluoroethylene: 33 wt. %, acetylene black: 66 wt. %, surfactant: 1 wt. %) were thoroughly kneaded and were then formed into pellets of 13 mm in diameter. Those pellets were held between nickel nets, followed by compression bonding under a pressure of 3.8 t/cm$^2$. The resultant preform was then dried in vacuo at 150° C. for 5 hours, whereby an electrode was prepared. A lithium foil was used as a counter electrode. Employed as an electrolyte was a 1 mole/l solution of lithium perchlorate in an equimolar mixed solvent of ethylene carbonate and diethylene carbonate. Under constant-current charging and discharging of 0.1 mA/cm$^2$ in current density, the service capacity of the battery was measured. Evaluation results are presented below in Table 1. From the results of Table 1, it is understood that a lithium ion secondary battery making use of a carbonaceous material according to the present invention shows a high capacity and a low irreversible capacity.

TABLE 1

| | Used raw material | Oxidation treatment | Service capacity (mAh/g) | Irreversible capacity (mAh/g) |
|---|---|---|---|---|
| Example 1 | Vacuum distillation residual pitch | Applied | 312 | 30 |
| Example 2 | Vacuum distillation residual pitch | Applied | 291 | 34 |
| Comp. Ex. 1 | Vacuum distillation residual pitch | Not Applied | 260 | 52 |
| Comp. Ex. 2 | Heat-treated pitch | Applied | 274 | 57 |

EXAMPLES 3–5 & COMPARATIVE EXAMPLES 3–5

Mesophase pitches having physical properties presented in Table 2 were obtained by changing the heat treatment conditions of the vacuum distillation residual pitch in Example 1 as shown below in Table 2.

TABLE 2

| Ex/Comp. Ex. | Heat-treatment conditions | Yield (%) | Quinoline-insoluble components (%) | Toluene-insoluble components (%) | Softening point (° C.) | Content of anisotropoic component (vol. %) |
|---|---|---|---|---|---|---|
| Example 3 | 400/3.6/1.7 | 73.2 | 52 | 73 | 288 | 51 |
| Example 4 | 400/4.0/1.7 | 67.3 | 74 | 81 | 358 | 70 |
| Example 5 | 400/4.0/1.7 | 69.7 | 65 | 80 | 322 | 58 |
| Comp. Ex. 3 | 400/3.0/1.7 | 79.1 | 40 | 60 | 262 | 38 |
| Comp. Ex. 4 | 400/3.4/1.7 | 77.5 | 45 | 65 | 276 | 44 |
| Comp. Ex. 5 | 400/5.0/1.7 | 60.1 | 92 | 96 | 372 | 97 |

Note) Heat-treatment conditions: temperature (° C.)/time (hr)/introduced gas volume ($Nm^3$/pitch-Kg · hr)

Using the mesophase pitches obtained above, carbonaceous materials were obtained as invention examples and comparative examples in the same manner as in Example 1. They were also evaluated as electrode materials. The results are summarized in Table 3. From the results of Table 3, it is understood that a lithium ion secondary battery making use of a carbonaceous material according to the present invention exhibits a high capacity and a low irreversible capacity.

TABLE 3

| | Service capacity (mAh/g) | Irreversible capacity (mAh/g) |
|---|---|---|
| Example 3 | 275 | 47 |
| Example 4 | 311 | 33 |
| Example 5 | 292 | 50 |
| Comp. Ex. 3 | 214 | 60 |
| Comp. Ex. 4 | 254 | 55 |
| Comp. Ex. 5 | 271 | 80 |

EXAMPLES 6–9 & COMPARATIVE EXAMPLES 6–7

Carbonaceous materials were obtained as invention examples and comparative examples in the same manner as in Example 1 except that the conditions for the oxidation treatment were varied in various ways to provide the resultant oxidized products with varied oxygen contents. They were also evaluated as electrode materials. The results are summarized in Table 4. From the results of Table 4, it is understood that a lithium ion secondary battery making use of a carbonaceous material according to the present invention exhibits a high capacity and a low irreversible capacity.

TABLE 4

| Ex/Comp. Ex. | Oxidation conditions (° C./min) | Content of oxygen in oxidized product (%) | Aspect ratio of fine oxide particles | Service capacity (mAh/g) | Irreversible capacity (mAh/g) |
|---|---|---|---|---|---|
| Example 6 | 260/30 | 5.0 | 1.6 | 310 | 46 |
| Example 7 | 270/15 | 6.2 | 1.5 | 308 | 33 |
| Example 8 | 250/20 | 2.7 | 1.7 | 287 | 50 |
| Comp. Ex. 6 | 210/10 | 1.8 | 2.3 | 207 | 63 |
| Comp. Ex. 7 | 270/40 | 12 | 1.5 | 259 | 108 |

What is claimed is:

1. A process for the production of a carbonaceous material comprising the following steps:

subjecting a vacuum distillation residual pitch to heat treatment at a temperature of up to 420° C. until the content of quinoline-insoluble components thereof becomes 50 to 80 wt. %, whereby said pitch is converted into a mesophase pitch;

grinding the thus-obtained mesophase pitch into fine particles having an aspect ratio not greater than 2;

subjecting the thus-ground product to oxidation treatment; and subjecting the thus-oxidized product to carbonization or graphitization treatment.

2. The process of claim 1, wherein the content of quinoline-insoluble components in said mesophase pitch is from 55 to 80 wt. %.

3. The process of claim 1, wherein the contents of quinoline insoluble components and toluene-insoluble components in said mesophase pitch are from 55 to 80 wt. % and from 70 to 90 wt. %, respectively.

4. The process of claim 1, wherein said heat treatment of said pitch is conducted until the softening point of said pitch rises to at least 280° C.

5. The process of claim 1, wherein said heat treatment of said pitch is conducted until the softening point of said pitch rises to 320 to 370° C.

6. The process of claim 1, wherein said heat treatment of said pitch is conducted until the content of an optically anisotropic (mesophase) component in said pitch increases to at least 50 vol. %.

7. The process of claim 1, wherein said heat treatment of said pitch is conducted until the content of an optically anisotropic (mesophase) component in said pitch increases to 60 to 95 vol. %.

8. The process of claim 1, wherein said oxidation treatment is conducted to an extent that the content of oxygen in said oxidized product becomes 2 to 10 wt. %.

9. A lithium ion secondary battery comprising a negative pole made of the carbonaceous material of claim 1.

* * * * *